Oct. 26, 1954   P. H. MANNING   2,692,578
DEVICE FOR RECEIVING AND PRESERVING EGGS
Filed Sept. 20, 1951   3 Sheets-Sheet 1
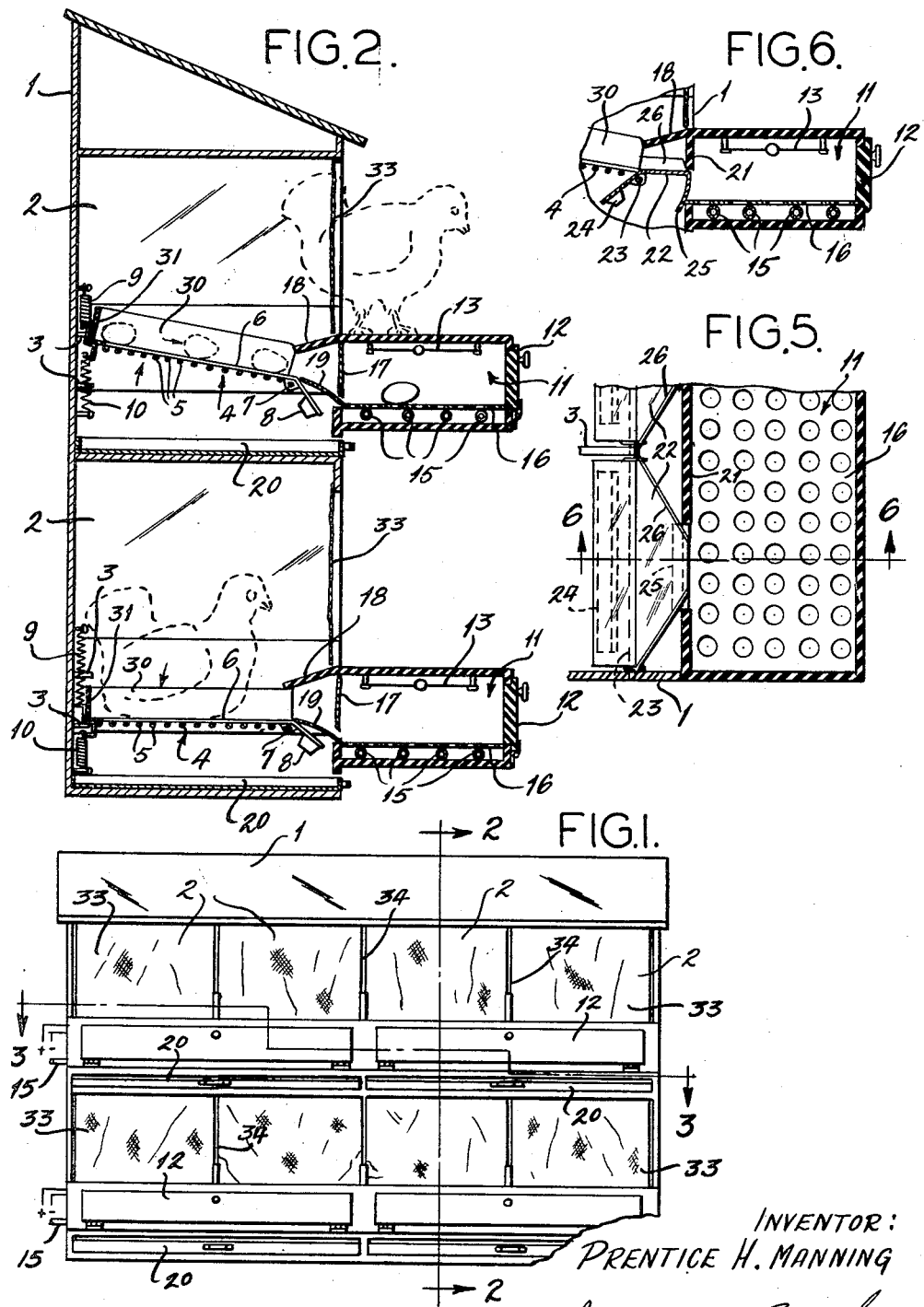
INVENTOR:
PRENTICE H. MANNING
By Bruinga and Sutherland
ATTORNEYS.

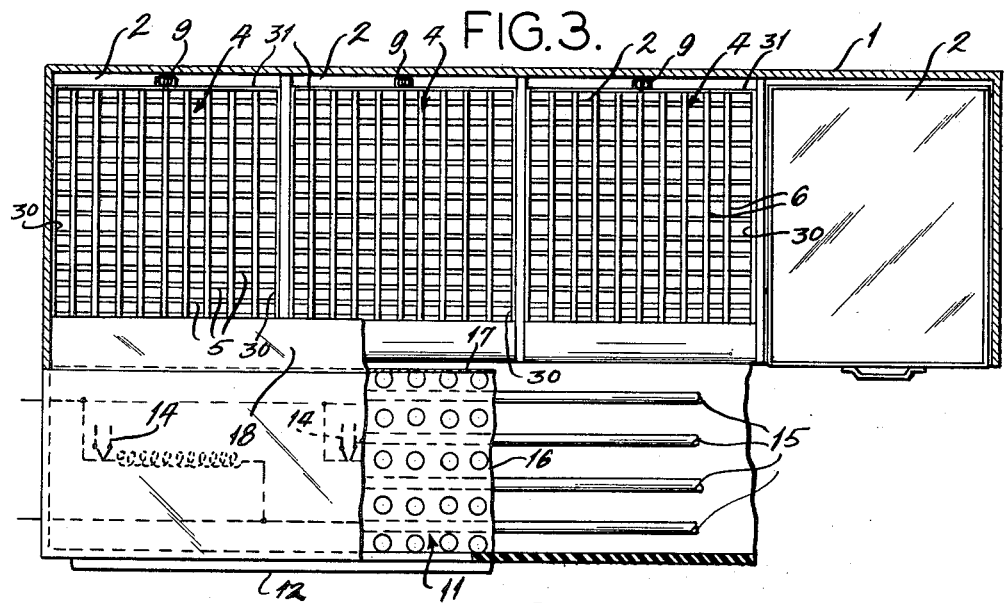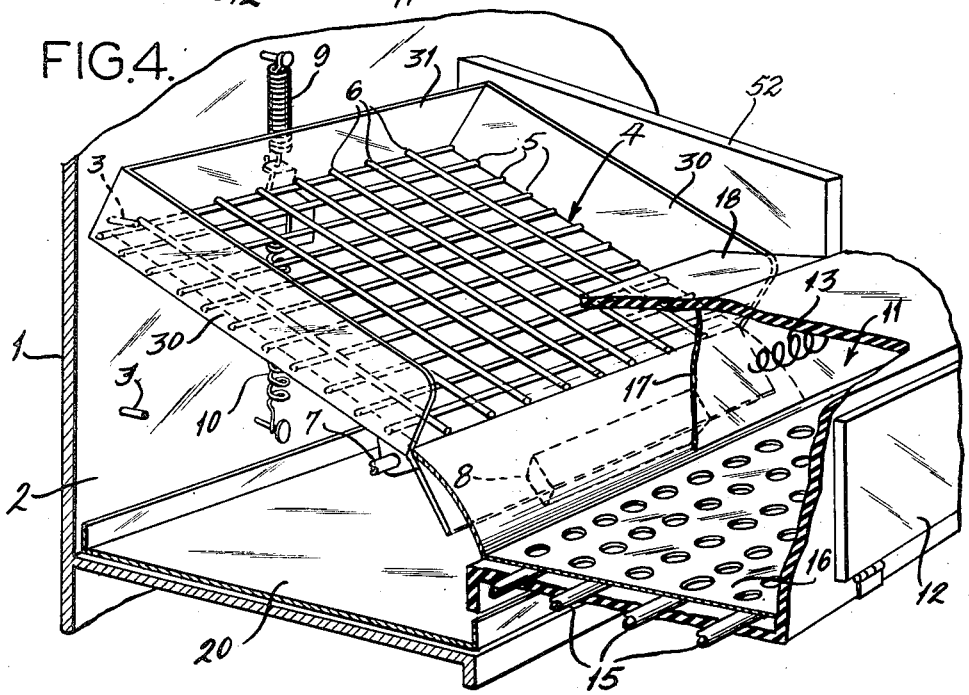

Oct. 26, 1954     P. H. MANNING     2,692,578
DEVICE FOR RECEIVING AND PRESERVING EGGS
Filed Sept. 20, 1951     3 Sheets-Sheet 3
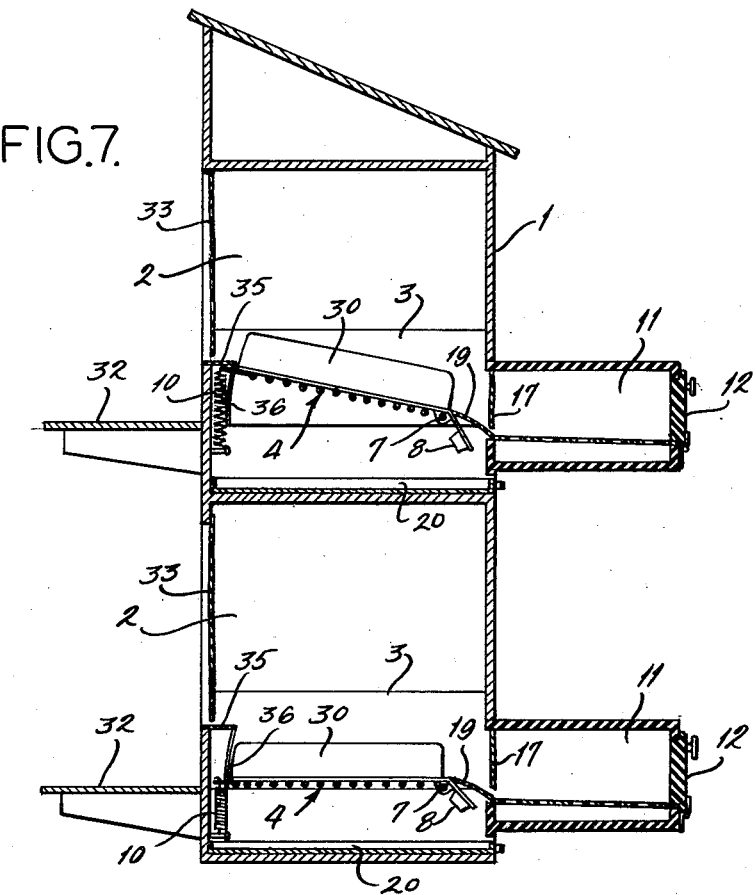
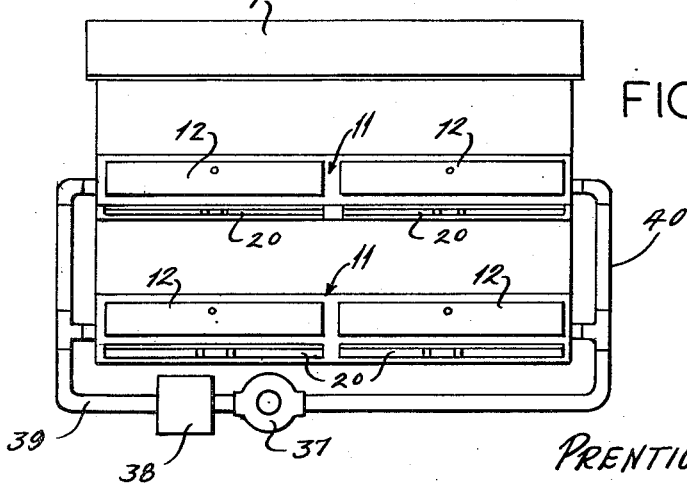
INVENTOR:
PRENTICE H MANNING
ATTORNEYS.

Patented Oct. 26, 1954

2,692,578

UNITED STATES PATENT OFFICE 2,692,578

DEVICE FOR RECEIVING AND PRESERVING EGGS

Prentice H. Manning, Jerseyville, Ill.; Therese H. Manning, executrix of said Prentice H. Manning, deceased Application September 20, 1951, Serial No. 247,500

3 Claims. (Cl. 119—48)

This invention relates generally to hens' nests and particularly to a nest structure constructed and arranged to receive and maintain eggs at a temperature between 33° F. and 60° F.

It has heretofore been proposed to remove eggs from the hen's nest immediately after they are deposited therein and to transfer them to a refrigerated chamber where they are maintained until collection. In my co-pending application, now Patent No. 2,674,226, issued April 6, 1954, such a device is disclosed. In the arrangement disclosed in my said co-pending application, the egg is caused to travel a substantial distance between the nest and the receiving chamber which is maintained at a substantially uniform temperature. In the course of this travel, the egg is not only subject to the hazard of breakage, but as it rolls along its path in its freshly-laid, relatively moist condition, it picks up dirt and thus deleteriously affects the grade of the egg.

The object of the present invention generally stated is to overcome the disadvantages aforesaid, and to provide a nest structure wherein the eggs are maintained at a controlled temperature immediately after they are left by the hen.

Another object of the invention is to provide a temperature controlled egg receiving compartment so positioned relative to a nest that the leakage of temperature controlled air from the egg receiving compartment contributes to the comfort of a hen on the nest.

A further object of the invention is to provide a nest wherein a hen may lay comfortably and wherefrom eggs are automatically discharged when the hen leaves the nest, but without imperiling the feet of the hen between the entrapment of relatively moving parts.

Other objects will become apparent to those skilled in the art when the following description is read in connection with the accompanying drawings in which:

Figure 1 is a view in front elevation of a series of nests constructed in accordance with the present invention;

Figure 2 is an enlarged sectional view taken along line 2—2 of Figure 1;

Figure 3 is an enlarged sectional view taken along line 3—3 of Figure 1;

Figure 4 is a perspective view showing the floor of the laying compartment of the nest in normal (i. e., unoccupied) position and its correlation with the egg receiving compartment;

Figure 5 is a plan view, part being shown in section, of a modified form of closure between the egg receiving compartment and the laying compartment of the nest;

Figure 6 is a sectional view taken along line 6—6 of Figure 5;

Figure 7 is a view corresponding to Figure 2 but showing another embodiment of the invention; and Figure 8 is a view corresponding to Figure 1 but showing the embodiment of Figure 7.

In accordance with the present invention, a nest is provided having a laying compartment adjacent which is arranged a temperature controlled egg receiving compartment. The egg receiving compartment is preferably provided with a means for heating as well as a means for cooling, and an appropriate control device for setting either the heating or the cooling means into operation, so as to maintain the temperature therein between a minimum of 33° F. and a maximum of 60° F., and preferably between 45° F. and 55° F. These limitations are, for the purpose of the present invention, to be considered as a substantially uniform temperature.

The invention further contemplates a movable floor in the laying compartment of the nest. Such floor is preferably arranged so that under the weight of a hen standing or sitting thereon, it will assume a substantially horizontal position; but when the hen removes therefrom, the floor tilts so as to slope toward the egg receiving compartment and cause the egg deposited on such floor to roll into the egg receiving compartment. Normally, the floor of the nest is biased into the aforesaid tilted position by weights, springs, or otherwise, the force of such bias being, however, insufficient to prevent the nest from assuming a substantially horizontal position when occupied by a hen.

Between the egg receiving compartment and the laying compartment a movable closure is provided which has the dual function of substantially preventing the loss of heat or cold from the egg receiving compartment and also retarding the egg as it rolls from the aforesaid tilted floor into the egg receiving compartment. Preferably, the closure is arranged so as to provide a slight amount of leakage of air from the egg receiving compartment through the closure, and the latter is preferably supplemented by one or more baffles disposed so as to direct the leaked air toward a hen on the nest.

As a further contribution toward the comfort and peace of mind of the laying hen, the laying compartment of the nest is preferably incompletely separated from adjacent laying compartments. This is accomplished by subdividing the movable floor into a series of independently movable sections, each representing a laying compartment or single nest. The several laying compartments are separated by partitions which extend but partway from the floor to the top of the laying compartments. Such partitions are preferably arranged so as to vertically overlap the edge of adjacent movable floor section, irrespective of its position, and thus eliminate the possibility that toes be pinched.

At one side of each nest section a deep opening is provided having individual drapes or curtains depending from the top thereof. Each curtain is sufficiently separated from its neighbor that ingress to and egress from the laying compartment is easy for the hen.

In order to assure sanitation in the laying compartment, the floor thereof is preferably formed of wire mesh and immediately therebelow a droppings tray is arranged. The mesh of the floor is of sufficient size to readily pass the droppings if and as they are deposited on the floor of the nest, and consequently the floor of the nest remains relatively clean at all times.

Having thus generally described the invention, reference may now be made to the accompanying drawings for an illustrative embodiment thereof.

Referring to Figure 1 of the drawings, a compartmented nest is shown wherein the laying compartments are arranged in two tiers, one above the other, all being embraced by a unitary housing 1. The several laying compartments 2 are separated from each other (in the same tier) by suitable partitions 52 which have their upper edges terminating at or about neck height of a hen sitting on the nest. Thus the partitions 52 compel the hen to choose one compartment or the other, but there is an open space above the partition of sufficient magnitude to permit a hen to pass from one laying compartment to the next or to look over when in laying position.

Within each of the laying compartments, a movable floor 4 is provided. The floor is preferably formed of wire mesh and, in the embodiment shown, is constituted of a series of parallel wires 5 extending crosswise of the nest and underlying a similar series of wires 6 running at right angles thereto and above the wires 5. The wires 5 and 6 are spot-welded or otherwise connected together at the crossings and may be rubber-coated. With the wires arranged at a spacing of between ½" and 1", the interstices are of sufficient area to readily pass the droppings but to retain the eggs. The arrangement of the upper wire 6 is in the direction such as to provide a series of rails which direct the travel of the eggs from back to front of the floor 4. The floor 4 is mounted to tilt between the positions shown in the upper and lower compartments of Figure 2. To this end, the floor 4 is mounted for hinging movement about a shaft 7 suitably supported in the ends of housing 1. Stops 3 limit the extent of movement of floor 4. In order to bias the floor 4 into the tilted position shown in the upper compartment of Figure 2 when unoccupied by a hen, the front of floor 4 may be provided with a weight 8, the rear thereof with a tension spring 9 and a compression spring 10, all operating so as to urge the floor 4 into the tilted position shown in the upper compartment of Figure 2.

It will be understood that it is unnecessary to provide all three biasing elements as one will suffice when the force exerted thereby is sufficient to tilt the nest plus the weight of an egg deposited thereon; that is to say, after the hen has left the nest. The several biasing devices are preferably so coordinated with the weight of the normal hen that when she steps upon the nest, the floor 4 will assume the substantially horizontal position shown in the lower compartment of Figure 2 and remain in that position so long as the nest is occupied by the hen. When the hen steps from the nest, however, the floor 4 assumes its tilted position and an egg deposited thereon rolls forwardly on wires 6.

At the front of floor 4 and arranged so as to extend partly below and partly above the level thereof is an egg receiving compartment 11. The egg receiving compartment is preferably formed of insulating material and provided with a door 12 at the front thereof for manual removal of the eggs. In the top of the egg receiving compartment 11 an electric heating element 13 is provided. The egg receiving compartment preferably extends for the full length of the series of laying compartments in a tier, which is to say that the egg receiving compartment is not necessarily sub-divided into sections corresponding with the several laying compartments. It is preferable, however, to provide separate heating elements in front of each laying compartment, and it is also preferable to provide each individual heating element with its own thermostat 14, because the temperature of the end-most portion of the egg receiving compartment is frequently different from the temperature of the intermediate sections thereof.

While in the embodiment shown, individual doors 12 are shown in front of each laying compartment, it will be understood that a single partment, it will be understood that a single door providing access to the entire length of the egg receiving compartment may be provided.

The egg receiving compartment is also provided with a cooling device which in the embodiment shown consists of a series of coils 15 for conducting refrigerant from a suitable refrigerating device. The coils 15 are preferably arranged so as to be out of contact with the eggs in order to avoid local chilling, and consequently such coils may be overlaid by a sheet of reticulated insulating material 16. With such an arrangement, any condensation of moisture which occurs within the egg receiving compartment will preferentially take place on the coils 15 rather than where it can contact the eggs. The sheet 16 slants in the same direction as floor 4, but in lesser degree.

Suitable thermostatic controls are also provided within the compartment 11 for regulating the chilling effect of the refrigerant circulating through coil 15 so as to maintain the temperature thereof within the desired range.

In order to substantially prevent the loss of heat or cold from compartment 11, a suitable closure is provided at the rear thereof where the eggs enter from the laying compartment. In the embodiment shown in Figures 1 to 4 inclusive, this closure is in the form of rubber sheet 17, secured at its upper edge to the interior wall of the compartment 11 with its lower edge free, and, if need be, provided with a weight. Such a closure does not provide a prefect seal, and the invention takes advantage of this by also providing adjacent the rear opening of the compartment 11 a pair of baffles 18 and 19, arranged so as to direct the air which leaks past curtain 17 toward the hen on the nest. The baffle 18 may be an integral part of the top wall section of the compartment 11, and in any event is preferably so arranged as to constitute a walk-way which will prevent the hen from stepping near curtain 17. The baffle 19 may be a sheet of rubber or other flexible material. Indeed, the baffle 19 may be made of spring metal connected with the front end of floor 4 and conformed so as to bias the front end thereof downwardly. In this manner, the several weights and springs 8, 9, and 10 may be supplemented or in fact eliminated.

Beneath the floor 4, a removable droppings tray 20 is provided.

In situations where it is decided to minimize the air leakage from compartment 11, the closure 17 may be replaced by the arrangement shown in Figures 5 and 6. In this embodiment, the compartment 11 is provided with a depending fixed wall 21 extending downwardly from the top of the compartment and terminating sufficiently short of the floor of the compartment to permit an egg to pass therebeneath. The opening beneath the depending wall 21 is closed by a trap door 2 hinged at 23 and suitably biased as by a counter-weight 24 so as to normally assume the position shown in Figure 6. The trap door 22 is provided with an arcuate apron 25 which seals the opening at the rear of compartment 11 when in its normal position, but moves downwardly with trap door 22 under the weight of an egg deposited thereon so as to pass the latter on into the compartment 11. The lateral dimension of the opening closed by apron 25 may be minimized by providing the trap door 22 with upstanding flanges 26 to direct the travel of the rolling egg toward the center of the trap door and the opening beneath wall 21. With this arrangement, leakage of air from the compartment 11 may be substantially prevented.

The floor 4 is provided at its sides with upstanding flanges 30 which fit snugly against the partitions of the next adjacent laying compartment. If the partition 52 between any two adjacent compartments is omitted, the flanges 30 serve to prevent the pinching of the toes of the hen, should they be positioned in the edge of the floor when it moves downwardly under her weight or upwardly when her weight is removed. To this end, the height of the flanges 30 is made at least as high as the distance which the rear end of the floor moves between level and tilted positions. Thus it is impossible for a hen standing on one flange to insert her toes beneath the next adjacent floor 4 where they might be pinched during relative movement of the adjacent floor section. The back of the floor 4 may likewise be provided with an upstanding flange 31 if desired.

Referring now to Figures 7 and 8, for a further embodiment of the invention, wherein the hens gain access to the nest from the side opposite the egg-receiving compartments 11, it will be observed that the movable floor 4 is arranged with reference to the egg receiving compartment in precisely the same manner as in the previous embodiment. In this embodiment, however, the housing is provided with an opening for each tier of laying compartments at the side opposite the laying compartment. In gaining access to the laying compartments according to this embodiment, the hens step from a walk-way or roost 32 onto a suitable threshold 35 whose inside wall 36 is formed on a radius with shaft 7 as its center and disposed so as to be relatively close to the adjacent edge of floor 4. It is important that the fit between these parts be sufficiently close that the toes of a hen in stepping from threshold 35 onto floor 4 or vice-versa do not become pinched between stationary and movable parts.

In the embodiment shown in Figures 7 and 8, the temperature within egg receiving compartments 11 is controlled by the forced circulation of air at predetermined temperature. A suitably driven fan 37 is provided to force air through a temperature regulator 38 (which may be both a heater and a cooler, depending upon the condition desired), from whence a duct 39 extends with outlets into the ends of each of the egg receiving compartments 11. From the opposite ends of the compartments 11, a return duct 40 is provided, leading to blower 37. A suitable thermostatic control situated within the egg-receiving compartments 11 is provided as in the previous embodiment to set into motion the heating, cooling, and air-circulating devices as the need for them respectively arises.

At the access opening to each laying compartment (whether of the form shown in Figure 2 or the form shown in Figure 7) a curtain 33 is provided. These curtains may be formed of textile or other readily flexible material and weighted at the bottom so as to assure that they will hang straight and extend downwardly to the level of the top of compartment 11. The respective curtains 33 are spaced apart so as to provide a narrow slit 34 aligned with the several partitions 3 through which the hens may enter and leave the laying compartments by forcing the curtain back. The curtains 33 thus exclude light from the mid-sections of the laying compartments, but at the edges thereof admit enough light to show the hens the way out.

From the foregoing description, those skilled in the art should readily understand that the hens may gain access to the laying compartments by walking across the top members of the compartments 11 and having selected a laying compartment, step into it through the slits 34 by pushing back curtains 33. Walking over baffles 18, the hens step down upon the floor 4, and when their weight is imposed thereon, the latter moves from its tilted position to its substantially horizontal position. After the egg is deposited on the floor 4, it remains in position thereon until the hen steps from the floor whereupon the floor moves into its tilted position and causes the egg to roll downwardly between the wires 6 and to pass into the egg receiving compartment 11. In the latter, the egg loses its animal heat and is preserved at the desired temperature. When the eggs are to be hatched, it is important to maintain the temperature in compartment 11 between 45° and 55° F., but when the eggs are to be consumed as food, the temperature in compartment 11 may vary between 33° and 60° F. The eggs are then collected from the compartment 11.

From the foregoing description, those skilled in the art should readily understand the construction and operation of the invention, and realize that it accomplishes its object. While one complete embodiment of the invention has been disclosed in detail and various alternatives suggested, it is to be distinctly understood that the foregoing disclosure is merely for the purpose of illustration, and is not intended to be a limitation upon the invention. Such modifications and variations as occur to those skilled in the art, without departing from the spirit of the invention are, although not specifically described herein, contemplated by and within the scope of the appended claims.

Having thus described the invention, what is claimed and desired to be secured by Letters Patent is:

1. In a hen's nest having a laying compartment, and an egg receiving compartment, said laying compartment having a movable floor normally biased in a direction such that it slopes downwardly toward said egg receiving compartment, said floor being movable against the normal bias into substantially horizontal position under the weight of a hen, a movable closure between said laying compartment and said egg receiving compartment, said closure being normally closed but movable under the force applied thereto by an egg rolling down said floor, when tilted, to pass the egg into the receiving compartment, means operatively associated with said egg receiving compartment for maintaining the temperature in said egg receiving compartment at between 45° and 55° F., and baffle means mounted adjacent said movable closure for directing the air leakage through said closure toward the position of a hen on said floor.

2. A compartmented hen's nest comprising an enclosure, a plurality of movable floor sections each normally biased to slope toward an egg receiving compartment at the front, partitions between adjacent ones of said floor sections, said partitions having their upper edges located substantially below the top of the nest enclosure but extending above and below the extreme positions of said movable floor, and flexible curtains depending from the top of said enclosure at the front thereof between the partitions to adjacent the top of the egg receiving compartment.

3. In a hen's nest, a laying compartment having a floor; an egg receiving compartment in front of said laying compartment adjacent the floor level thereof and in confined air-interchange relationship therewith, said egg receiving compartment and said laying compartment having a mutual opening adjacent the floor level of the latter; a barrier across said opening, said barrier being movable to pass an egg from the laying compartment to the receiving compartment; baffle means mounted adjacent said movable barrier and disposed to direct air flowing from said receiving compartment into said laying compartment and above the floor level thereof; and means operatively associated with said egg receiving compartment for maintaining substantially uniform temperature in said egg receiving compartment.

References Cited in the file of this patent

UNITED STATES PATENTS

| Number | Name | Date |
|---|---|---|
| 860,880 | Olmsted | July 23, 1907 |
| 1,117,104 | Stelling | Nov. 10, 1914 |
| 1,399,614 | Groves | Dec. 6, 1921 |
| 1,402,790 | Olson | Jan. 10, 1922 |
| 1,431,278 | Backlind | Oct. 10, 1922 |
| 1,565,476 | Little et al. | Dec. 15, 1925 |
| 1,810,278 | Kielsmeier | June 16, 1931 |
| 1,837,528 | Burri | Dec. 22, 1931 |
| 1,911,633 | Lohrer | May 30, 1933 |
| 1,925,456 | Muehr | Sept. 5, 1933 |
| 2,022,843 | Busch | Dec. 3, 1935 |
| 2,026,801 | Ross | Jan. 7, 1936 |
| 2,090,906 | Teel | Aug. 24, 1937 |
| 2,122,349 | Miles | June 28, 1938 |
| 2,264,156 | Apple | Nov. 25, 1941 |
| 2,279,147 | Stimson | Apr. 7, 1942 |
| 2,501,475 | Muehlfeld | Mar. 21, 1950 |
| 2,584,909 | Ockenfels | Feb. 5, 1952 |

OTHER REFERENCES

Pacific Rural Press, November 1, 1941, page 289.